Figures 1, 2:
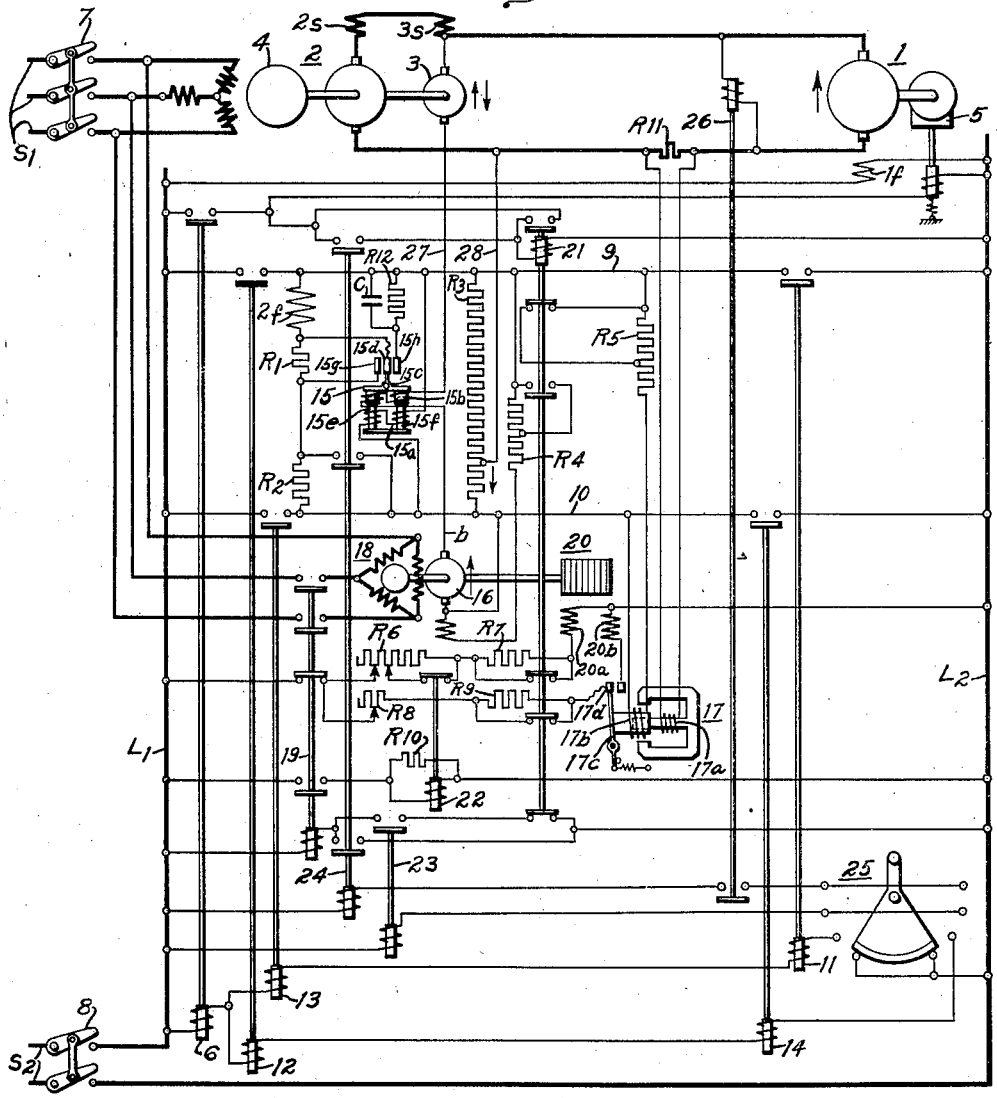

Oct. 25, 1932.     W. F. EAMES     1,883,886

MOTOR CONTROL SYSTEM

Filed June 27, 1931

WITNESSES

INVENTOR
William F. Eames
BY
ATTORNEY

Patented Oct. 25, 1932

1,883,886

UNITED STATES PATENT OFFICE

WILLIAM F. EAMES, OF EDGEWOOD, PENNSYLVANIA, ASSIGNOR TO WESTINGHOUSE ELECTRIC & MANUFACTURING COMPANY, A CORPORATION OF PENNSYLVANIA

MOTOR-CONTROL SYSTEM

Application filed June 27, 1931. Serial No. 547,389.

My invention relates to motor-control systems and has particular relation to motor-control systems of the type disclosed in my copending application, Serial No. 471,684, filed July 30, 1930, and assigned to the Westinghouse Electric and Manufacturing Company.

In the above mentioned application, a variable-voltage motor-control system is disclosed which is particularly applicable to elevator service or to other service in which accuracy of motor-speed regulation over a considerable range of loads and speeds is required. The motor is connected to a variable-voltage generator, in accordance with the above mentioned application, and the voltage of the generator is maintained, by means of a vibrating relay, at a value such that the motor counter-electromotive force, during operation, is equal to a control voltage furnished by a potentiometer. In order to vary the motor speed, the voltage furnished by the potentiometer is changed in steps by a series of time-element relays.

In accordance with the principle of the above mentioned application, the motor-speed regulation is automatically corrected by the vibrating relay, and the rate of change of speed of the motor during deceleration is fixed, by the series of time-element relays, at a value suitable for automatic landing. I have found, however, that, in order to produce a system of this type, in which the motor may be decelerated with a maximum degree of smoothness, it is necessary to employ a large number of time-element relays. As such a series of relays adds to the complication of the system and affords a possible source of disorder, it is preferable to avoid its use if possible.

It is, accordingly, an object of my invention to provide a motor-control system of the type disclosed in the above mentioned application in which the control voltage for determining the motor speed shall be furnished by an auxiliary dynamo-electric machine operated at variable speed.

More specifically stated, it is an object of my invention to provide a motor-control system of the variable-voltage type, in which the speed of the motor is determined by the voltage of an auxiliary generator driven at a variable speed, regardless of the motor load.

Other objects of my invention will become evident from the following detailed description, taken in conjunction with the accompanying drawing, in which Fig. 1 is a diagrammatic view of a system of control organized in accordance with the present invention.

Fig. 2 is a simplified diagrammatic view illustrating the main armature circuit and a control circuit of the system shown in Fig. 1.

Referring to the drawing, the apparatus shown in Fig. 1 comprises a direct-current motor 1, the speed of which is to be controlled, having its armature connected in a local circuit with the armature and series field winding 2s of a main direct-current generator 2 and the winding 3s of a correction generator 3.

The correction generator 3 is designed to generate a voltage equal to the resistance drop of the armature of motor 1, at all times when the system is in operation. The series winding 2s of generator 2 is designed to raise the voltage of generator 2, with positive or motoring loads and to lower it with negative or overhauling loads, a sufficient amount to maintain the speed of motor 1 approximately constant over a wide range of loads. Since, as will hereinafter more fully appear, other means are provided for correcting the speed regulation of motor 1, the series winding 2s may be designed to have less effect than that necessary to correct the speed regulation of motor 1, or it may be omitted entirely.

The motor 1 is provided with a spring-applied, electromagnetically-released brake 5, of usual type, mounted on the motor shaft; the release winding of which is controlled by a brake relay 6.

The armatures of the main generator 2 and of the correction generator 3 are mechanically connected to any suitable driving element, such as the armature of an induction motor 4. A manual switch 7 is provided for connecting the windings of the induction motor 4 to a suitable alternating-current source S1.

A pair of supply conductors L1 and L2, connected to a suitable direct-current source S2 by means of a manual switch 8, are provided for supplying the direct current used in the control system.

The motor 1 is provided with a separately excited field winding 1f, connected to the supply conductors L1 and L2. The separately excited field winding 2f of the main generator 2 is connected, in series with resistors R1 and R2, to a pair of conductors 9 and 10, which serve to supply current to the circuits of the system through which a reversal of current is necessary in order to reverse the direction of rotation of the motor 1. The conductor 9 may be connected to either of supply conductors L1 and L2 by means of either of a pair of reversing switches 11 and 12. Similarly, the conductor 10 may be connected to either of supply conductors L1 and L2 by means of either of a pair of reversing switches 13 and 14.

In addition to the circuit of the field winding 2f of generator 2, the following elements and circuits are connected, in parallel, to the conductors 9 and 10; (I) the stationary coils 15a of a vibrating relay 15, (II) a potentiometer resistor R3, (III) a circuit including a resistor R4 and the field winding of a control generator 16 and (IV) a circuit including the movable coil 17b of a load relay 17 and a resistor R5.

An auxiliary induction motor 18, having its windings connected to the alternating-current source S1, in series with a manual switch 7 and a starting switch 19, is provided for driving the control generator 16. The armatures of auxiliary motor 18 and control generator 16 are mounted on a common shaft with an electromagnetic brake 20.

The electromagnetic brake 20 comprises a plurality of induction discs, preferably of high-resistance metal, such as cast iron, mounted to revolve in the magnetic field produced by a pair of braking windings 20a and 20b. Upon energization of the windings, eddy currents are set up in the discs which retard their rotation. By choosing discs of proper number and thickness, and by varying the current in the braking windings 20a and 20b, the flywheel effect and braking torque respectively, of the brake 20 may be fixed at values suitable for proper deceleration of the armature of control generator 16, in a manner contemplated by my invention, as will hereinafter more fully appear.

The braking windings 20a and 20b are connected in separate circuits which are joined to be controlled by back contact members of the starting switch 19. The circuit of braking winding 20a includes a pair of resistors R6 and R7, and the circuit of braking winding 20b includes a pair of resistors R8 and R9 and a set of contact members 17d of of the load relay 17. The resistors R7 and R9 are controlled by a relay 21 which also serves to control both the resistor R4, in series with the field winding of control generator 16, and the resistor R5, in series with movable coil 17b of the load relay 17.

A section of the resistor R6 is controlled by a time-element relay 22, having its operating coil connected to supply conductors L1 and L2 in series with contact members of the starting switch 19. A discharge resistor R10 is shunted across the terminals of the operating coil of time-element relay 22, to provide an inductive time delay in the opening of the relay.

The operating coil of starting switch 19 is connected to supply conductors L1 and L2 in series with contact members of an intermediate-speed switch 23. A high-speed switch 24 is provided for establishing a holding circuit for the starting switch 19, independent of contact members of the intermediate speed switch 23, for completing a circuit for the relay 21 and for controlling the resistor R2 in series with field winding 2f of generator 2.

The reversing switches 11, 12, 13 and 14, the brake relay 6 and the intermediate- and high-speed switches 23 and 24, respectively, are controlled, in a well known manner, by means of a manual controller 25. A voltage-responsive relay 26 is provided for preventing the closure of the high-speed switch 24, regardless of the position of manual controller 25, if the voltage of generator 2 is below a predetermined value.

The load relay 17 is preferably of the moving-coil type disclosed in a copending application of Walter Schaelchlin, Serial No. 456,330, filed May 28, 1930 and assigned to the Westinghouse Electric and Manufacturing Company. The purpose of this relay, as used in connection with my invention, is to introduce a correction for a rise of motor speed beyond the theoretical value calculated from the motor terminal voltage and armature resistance drop, which rise occurs with very heavy regenerative loads. The relay 17 comprises a magnetic structure having a core portion upon which is mounted the stationary coil 17a. The movable coil 17b of the relay is mounted upon a pivoted non-magnetic armature 17c, in a position to be influenced by the magnetic field produced by the stationary coil 17a. Contact members 17d, biased to open position by any suitable means, are controlled by the armature 17c. The stationary coil 17a is connected in parallel with a shunt R11, in the local circuit of the armature of generator 2 and motor 1. As mentioned above, the movable coil 17b is connected to the conductors 9 and 10. The relative direction of the magnetic fields produced by coils 17a and 17b, when the system is in operation, is such that the armature 17c is moved clockwise to cause closure of contact members 17d when the load on motor 1 is overhauling, that is to say, when the motor 1 is being driven as a generator, and the motor-armature current exceeds a predetermined value. At all other times, the contact members 17d are maintained in open position.

The vibrating relay 15 comprises two separate magnetic structures shown, diagrammatically, at 15e and 15f, secured to a suitable non-magnetic base. The stationary coils 15a are mounted, one upon each of the magnetic structures. The movable coils 15b of the relay are mounted upon a pivoted, non-magnetic armature 15c, in such positions that each movable coil 15b is influenced by the magnetic field produced by a respective stationary coil 15a. A movable contact member 15d is mounted on the armature 15c, in such position that it may engage either of a pair of stationary contact members 15g and 15h or occupy a neutral position in which it engages neither stationary contact member, depending upon the position of the armature 15c.

As previously mentioned, the stationary coils 15a are connected in series to conductors 9 and 10. The movable coils 15b are connected in a control circuit b, which includes the armature of control generator 16, the armature of correction generator 3, part of the potentiometer resistor R3, a pair of conductors 27 and 28 and the armature of motor 1. The relative directions of the voltages acting around the control circuit b, when the system is in operation, are as follows: the voltage produced by the potentiometer R3 and the voltage generated by the control generator 16, act in the same direction, in the control circuit, to oppose the terminal voltage of motor 1, as indicated by arrows in the drawing. The voltage generated by the correction generator 3 opposes the terminal voltage of the motor 1, when the motor 1 is drawing power from the main generator 2, or acts in the same direction as the terminal voltage of motor 1, when the motor 1 is returning power to the main generator 2. Since the voltage of correction generator 3 is equal to the resistance drop in the armature of motor 1, the voltage between the conductors 27 and 28 is, neglecting resistance drops in the control circuit, at all times, except during transition periods, equal to the counter-electromotive force of motor 1.

The magnetic fields produced by the coils 15a and 15b of the vibrating relay 15, when the system is in operation, act in such relative directions that, when the counter-electromotive force of motor 1 exceeds the sum of the voltages produced by the potentiometer resistor R3 and the control generator 16 in the control circuit b, the movable contact member 15d of the vibrating relay 15 engages the stationary contact member 15h. When, on the other hand, the counter-electromotive force of motor 1 is less than the sum of the voltages produced by the potentiometer resistor R3 and the control generator 16, the movable contact member 15d engages the stationary contact member 15g.

The contact member 15d of the vibrating relay 15, is connected to the junction point between the generator field winding 2f and the resistor R1. The contact member 15g of the vibrating relay, is connected to the remaining terminal of resistor R1. A resistor R12 and a condenser C are connected in parallel to the conductor 9 and the contact member 15h of vibrating relay 15. With the contact members 15d, 15g and 15h connected as described, the excitation of generator 2 is increased when movable contact member 15d engages the stationary contact member 15g and is decreased when movable contact member 15d engages the stationary contact member 15h.

Fig. 2 shows, in simplified form, the connections of the main armature circuit and control circuit b of the system shown in Fig 1. In Fig. 2, a battery E3 has been substituted for the potentiometer resistor R3. Otherwise the elements of Fig. 2 are identical with the corresponding elements of Fig. 1.

The relative directions of voltages acting in the circuits of Fig. 2 are indicated by arrows. The voltages of the control generator 16 and of the source E3 (corresponding to the potentiometer R3 of Fig. 1) act in the same direction, and oppose the terminal voltage of motor 1 in the control circuit, denoted by a light line. The voltage of the correction generator 3 opposes the terminal voltage of motor 1 in the control circuit when the motor 1 is drawing power from the generator 2, and acts in the same direction in the control circuit, as the terminal voltage of motor 1 when the latter is returning power to the generator 2. As the voltage of the correction generator 3 is always equal to the armature resistance drop of the motor 1, it will be apparent that the correction generator 3 acts to cause a voltage equal to the counter-electromotive force of motor 1 to be applied to the remaining devices in the control circuit. A current flows in the control circuit, therefore, only when the sum of the voltages of control generator 16 and source E3 differs from the counter-electromotive force of motor 1.

The operation of the apparatus shown in Fig. 1 may be set forth as follows: preliminary to operation of the motor 1 by means of the manual controller 25, the manual switches 7 and 8 are closed. Upon closure of the manual switch 7, the windings of induction motor 4 are connected to the alternating-current source S1, to cause the induction motor 4, together with the main generator 2 and correction generator 3, to accelerate to running speed. Upon closure of the manual switch 8, the supply conductors L1 and L2 are connected to the direct-current source S2. Circuits for the field winding 1f of motor 1 and the braking winding 20a are now completed, and the field of motor 1 builds up to full value in the usual manner. The completion of the circuit for the brake winding 20a has no effect, at this time, however, as the discs of the brake 20 are at rest.

Operation of the motor 1 may now be initiated by the manual controller 25. If the handle of manual controller 25 is moved to the right to its first operating position, an energizing circuit for the operating coils of reversing switches 11 and 13 and brake relay 6 is completed. The reversing switches 11 and 13 close to connect the conductors 9, and 10 to the supply conductors L1 and L2, respectively. The brake relay 6 closes to complete a circuit for the release coil of brake 5

As the voltage of source S2 is now impressed between the conductors 9 and 10, the current in the field winding 2f of generator 2 builds up to a low value, limited by the resistors R1 and R2. The stationary coils 15a of vibrating relay 15 are also energized, and circuits for the field winding of control generator 16, for the potentiometer resistor R3, and for the moving coil 17b of the load relay 17 are completed.

The voltage produced by the potentiometer resistor R3 in the control circuit b now acts unopposed to cause the movable contact member 15d of vibrating relay 15 to engage the stationary contact member 15g. Upon engagement of the contact members 15d and 15g, the resistor R1 is short-circuited to cause the current in the field winding 2f to increase further.

As the current in field winding 2f builds up, the generator 2 produces an increasing voltage, to cause a current to flow in the common armature circuit of generator 2 and motor 1. As the armature current of motor 1 increases, the motor exerts a torque and accelerates, its counter-electromotive force increasing as its speed increases. The counter-electromotive force of motor 1 now acts, in the control circuit b, to oppose the voltage produced by the potentiometer resistor R3.

When the speed of motor 1 reaches such value that its counter-electromotive force equals the voltage produced by the potentiometer resistor R3, the current in the control circuit b falls to zero, and the movable contact member 15d is disengaged from the stationary contact member 15g, to re-insert the resistor R1 in series with the generator field winding 2f. The terminal voltage of generator 2 now falls, to cause a decrease of speed of the motor 1. As the speed of motor 1 falls, its counter-electromotive force falls also, until the movable contact member 15d of vibrating relay 15 again engages the stationary contact member 15g. In this way, the armature 15c of relay 15 vibrates, and the frequency and duration of the contacts of contact members 15d and 15g determine such average value of current in the field winding 2f that the speed of motor 1 is maintained constant.

If, because of an overhauling load, the motor 1 is driven as a generator, its speed rises until its counter-electromotive force exceeds the voltage produced by the potentiometer resistor R3. This causes the movable contact member 15d of vibrating relay 15 to engage the contact member 15h. Upon engagement of contact members 15d and 15h, the resistor R12 and the condenser C are connected in parallel with the field winding 2f to reduce the excitation of generator 2. The terminal voltage of generator 2 now falls, to increase the regenerative load on motor 1. The motor 1 now exerts a braking torque which acts to decrease its speed until the motor counter-electromotive force again becomes equal to the voltage produced by potentiometer resistor R3. When the latter condition obtains, the movable contact member 15d becomes disengaged from the stationary contact member 15h, to disconnect the resistor R12 and condenser C and to cause the process described above to be repeated.

From the above, it will be seen that the vibrating relay 15 acts to maintain the speed of motor 1 constant, regardless of the value or direction of the load, at a value determined by the voltage in the control circuit b acting in opposition to the motor counter-electromotive force.

During the regenerative braking operation with overhauling loads, described above, the armature current attains only such values as are necessary to retard overhauling loads moving at substantially constant speed. The load relay 17, which is designed to operate at the higher regenerative loads which occur during deceleration, does not, therefore, operate.

If the handle of the manual controller is now moved farther to the right to its second operating position, a circuit for the operating coil of intermediate-speed switch 23 is completed. The latter switch closes to complete a circuit for the operating coil of starting switch 19 to thereby cause the starting switch 19 to close. The starting switch 19, in closing, completes a circuit for the operating coil of time-element relay 22, opens the common portion of the circuits of braking windings 20a and 20b of electromagnetic brake 20 and connects the windings of auxiliary induction motor 18 to the alternating-current source S1. As the operating coil of relay 22 is now connected directly to the supply conductors L1 and L2, the closure of the relay is not retarded by the discharge resistor R10, and accordingly occurs without substantial time delay. Upon the connection of the windings of auxiliary induction motor 18 to the source S1, the auxiliary motor 18, together with the control generator 16 and the brake 20, accelerates to running speed.

As the control generator 16 accelerates, its terminal voltage rises to finally attain a value which is limited by the resistor R4 in its field circuit. During the acceleration of control generator 16, the vibrating relay 15 acts, in the manner previously described, to vary the voltage of generator 2 in such manner that the counter-electromotive force of motor 1 is held equal to the voltage opposing the motor counter-electromotive force in the control circuit b. The latter voltage now consists of a fixed component, furnished by the potentiometer resistor R3, and an increasing component, furnished by the control generator 16. The counter-electromotive force and the speed of motor 1, therefore, follow an increasing succession of values determined by the voltage of control generator 16, each independent of the load on motor 1. As the generator 16 accelerates, the terminal voltage of generator 2 rises to a value exceeding the predetermined value at which the voltage-responsive relay 26 is designed to operate. The relay 26, accordingly, closes to partially complete a circuit for the operating coil of high-speed switch 24. When the speed and voltage of control generator 16 become steady, the motor 1 operates at a constant intermediate speed.

If the handle of manual controller 25 is now moved farther to the right to its final operating position, an energizing circuit for the operating coil of the high-speed switch 24 is completed, and the latter closes. The high-speed switch 24, in closing, establishes a holding circuit for the starting switch 19, independent of contact members of the intermediate-speed switch 23, short-circuits the resistor R2 and completes a circuit for the operating coil of relay 21. The short-circuiting of resistor R2 causes the excitation and terminal voltage of generator 2 to build up to a higher value. At the same time, the relay 21 operates to open its contact members in the circuit of starting switch 19, to remove short circuits from the resistors R5, R7 and R9, to short circuit a section of resistor R4 and to complete a holding circuit for itself. The insertion of a section of resistor R5 adjusts the sensitiveness of the load relay 17 to correspond to the desired correction which will be introduced by the relay 17 during deceleration, as will be hereinafter more fully explained.

The insertion of resistors R7 and R9 has no immediate effect, because the circuits of the braking windings 20a and 20b of the electromagnetic brake 20 are, at this time, open at the contact members of starting switch 19. The short circuiting of a section of resistor R4 causes the excitation and voltage of control generator 16 to build up to a maximum value. As the voltage of control generator 16 rises, the vibrating relay 15 acts, in the manner previously described, to maintain the counter-electromotive force of motor 1 equal to the sum of the voltages produced by the control generator 16 and the potentiometer resistor R3. The motor 1, accordingly, accelerates to high speed.

When it is desired to stop the motor 1, the handle of manual controller 25 is returned to the left, toward central position. Upon movement of the handle of manual controller 25, to the left, to intermediate speed position, the circuit of high-speed switch 24 is broken, and the latter switch drops out. The high-speed switch 24, in dropping out, breaks the circuit of starting switch 19; re-inserts the resistor R2 in series with the field winding 2f and opens the closing circuit of the relay 21. The relay 21, notwithstanding the interruption of its closing circuit, remains closed because of its holding circuit mentioned above. The starting switch 19 drops out to complete circuits for the braking windings 20a and 20b of the electromagnetic brake 20, to break the energizing circuit of time element relay 22 and to disconnect the auxiliary induction motor 18 from the alternating-current source S1. The operating coil of relay 22, although disconnected from the supply conductors L1 and L2, is connected in a discharge circuit with the resistor R10 and is, consequently, held in for a period of time determined by the time element of its discharge circuit.

In response to the interruption of the circuit for the windings of auxiliary motor 18 and the completion of circuits for the braking windings 20a and 20b, the assembly of the rotating parts of auxiliary motor 18, control generator 16 and electromagnetic brake 20 immediately commences to decelerate. As the speed and the voltage of control generator 16 falls, the vibrating relay 15 acts to cause a corresponding decrease of the counter-electromotive force and speed of motor 1.

As the rate of deceleration of motor 1 is fixed by the rate of change of the voltage of control generator 16, the armature current of motor 1 may assume any motoring or any regenerative value necessary to retard the motor at the fixed rate. With an overhauling load, the motor 1 now operates with a heavy regenerative armature current, which may attain such value that the motor speed, because of armature reaction, exceeds the theoretical value calculated from its terminal voltage and armature resistance drop. As the regulating effect of the correction generator 3 is based upon the armature resistance drop of the motor 1, the speed of the motor 1, under such regenerative load conditions, would exceed that determined by the control generator 16, if other regulating means were not provided. However, upon the occurrence of such a heavy regenerative load, the load relay 17 operates to close its contact members 17d. A circuit for the braking winding 20b is, accordingly, completed, and the retarding torque of the electromagnetic brake 20 is increased. The control generator 16 now decelerates more rapidly, to maintain the rate of deceleration of motor 1 at the same value it would have with motoring loads or with lighter regenerative loads. When the regenerative current of motor 1 falls below the value at which the load relay 17 is designed to operate, the contact members 17d open to interrupt the circuit of the braking winding 20b.

At the expiration of the predetermined period of time necesary for the time-element relay 22 to operate, the latter opens to reinsert a section of resistor R6 in series with the braking winding 20a. The retarding torque of the electromagnetic brake 20 now decreases to reduce the rate of change of voltage of the control generator 16, during the latter stages of deceleration.

When the control generator 16 is finally brought to rest, the vibrating relay 15 acts to maintain the counter-electromotive force of motor 1 equal to the voltage produced by the potentiometer resistor R3 in the control circuit b. The motor 1 now operates at a corresponding low speed.

If the manual controller 25 is now centered, the circuit for the reversing switches 11 and 13 and the brake relay 6 is broken to cause the reversing switches 11 and 13 and the brake relay 6 to drop out. The reversing switches 11 and 13, in dropping out, disconnect the conductors 9 and 10 from the supply conductors L2 and L1, respectively, to thereby interrupt circuits for all of the devices connected between conductors 9 and 10. The brake relay 6, in dropping out, interrupts the holding circuit of relay 21, to cause the latter to drop out and interrupt the circuit of the release coil of brake 5 to thereby cause the application of the brake.

The motor 1 is now rapidly brought to rest by the action of the brake 5.

The operation so far described is that which occurs when the motor 1 is accelerated to full speed and then brought to rest. If the motor 1 is accelerated only to intermediate speed, by moving the manual controller 25 to its second operating position, and is then brought to rest by centering the manual controller 25, the operation is somewhat different in that the relay 21 does not close. The operation of accelerating the motor to intermediate speed is identical with that described. However, when the manual controller 25 is returned from its second to its first operating position, the intermediate-speed switch 23 drops out to interrupt the circuit of starting switch 19. The starting switch 19, accordingly, drops out to complete a circuit for the braking winding 20a of the electromagnetic brake 20, to interrupt the circuit of the time-element relay 22 and to disconnect the auxiliary induction motor 18 from the alternating-current source S1. As the relay 21 is, at this time, open, the resistor R7 in the circuit of the braking winding 20a is short-circuited. The braking winding 20a, therefore, draws a larger current to cause more rapid deceleration of the control generator 16 than occurred during deceleration after operation at high speed. The motor 1, accordingly, decelerates at a correspondingly higher rate.

A section of the resistor R5 in the circuit of the moving coil of relay 15 is now short circuited, since the relay 21 is open. The relay 15, accordingly, responds to lower values of regenerative current than was the case during deceleration after operation at high speed.

When the control generator 16 is brought to rest by the action of the electromagnetic brake 20, the motor 1 operates at a low speed determined by the voltage of potentiometer resistor R3 acting in the control circuit b. The motor 1 may now be brought to rest in the manner previously described, by centering the car switch 25.

The purpose of decelerating the control generator 16 more rapidly, after intermediate-speed motor operation, than after high-speed motor operation, is to cause the rate of change of voltage of the control generator to be approximately the same during either decelerating operation. As the excitation of control generator 16 is lower during intermediate-speed operation, its rate of deceleration must be made higher to produce the same rate of change of voltage as that produced during deceleration after operation of high-motor speed. In the application of my invention to elevator service, the intermediate speed corresponds to the maximum speed attained during a one-floor run, whereas the high speed corresponds to the speed attained during runs of two or more floors.

It will be noted that, in the system described above, the load relay 17 introduces a correction during the interval in which the regenerative load on the motor 1 exceeds a predetermined value. As the duration of this interval is a measure of the regenerative load occurring during deceleration, the total correcting effect of the relay 17, during a decelerating operation, is determined by the regenerative load.

It will be understood that the above described system is illustrative only and that many devices, which would be used in practice but which are not necessary to an understanding of the invention, have been omitted for simplicity.

In my copending application Serial No. 428,647, filed February 15, 1930, I have disclosed a motor-control system of the variable voltage type, in which the excitation of the generator supplying the work motor is controlled by a regulator responsive to the differences of voltages of an auxiliary generator driven at variable speed and a second auxiliary generator driven by the work motor, in such manner as to eliminate the effect of load upon the speed of the work motor.

In my copending application Serial No. 428,650, filed February 15, 1930, I have disclosed a variable voltage motor-control system, in which the excitation of the generator supplying the work motor is controlled in accordance with the difference of voltages of a potentiometer controlled by a series of time element relays and an auxiliary generator driven by the work motor, in such manner as to eliminate the effect of load upon the speed of the work motor.

In my copending application Serial No. 428,648, filed February 15, 1930, I have disclosed a variable voltage motor-control system, in which the excitation of the generator supplying the work motor is controlled by means of a differential device responsive to differential rotation of the work motor and an auxiliary motor, in such a manner as to eliminate the effect of load on the speed of the work motor, and in which the speed and rate of change of speed of the auxiliary motor may be independently controlled.

In my copending application Serial No. 445,303, filed April 18, 1930, I have disclosed a variable voltage motor-control system, in which the excitation of the generator supplying the work motor is controlled in accordance with the difference between the counter-electromotive force of the work motor and the voltage of an auxiliary generator driven at constant speed, in such a manner as to eliminate the effect of load upon the speed of the work motor.

In my copending application Serial No. 445,304, filed April 18, 1930, I have disclosed a variable voltage motor-control system, in which the excitation of the generator supplying the work motor is controlled in accordance with the counter-electromotive force of the work motor, as measured by the terminal voltage of the generator corrected for armature resistance drop, in such a manner as to eliminate the effect of load upon the speed of the work motor.

In my copending application Serial No. 471,684, filed July 30, 1930, I have disclosed an elevator system, in which the speed regulation of the elevator motor is corrected by means of a compounding arrangement and the rate of deceleration of the elevator motor is controlled by time element means, and in which a load responsive device is provided for operating upon the time element means to obtain uniform deceleration under all load conditions.

In the present application, I do not claim the control of the generator excitation broadly in accordance with a voltage proportional to the difference between the actual speed of the motor and a predetermined control speed, as this is the subject matter of my application Serial No. 428,647, filed February 15, 1930, mentioned above.

I do not claim the control of the generator excitation to cause the speed of the work motor to follow a predetermined succession of values, each independent of load, nor the control of the generator excitation in accordance with a control voltage furnished by the specific means of a potentiometer, nor the control of a field forcing resistor broadly in accordance with the speed of the work motor, as this subject matter is covered in my copending application Serial No. 428,650, filed February 15, 1930, mentioned above.

In the present application, I do not claim the control of the generator excitation in accordance with the differential rotation of the work motor, as compared with an independently driven rotary element, as this subject matter is claimed in my copending application Serial No. 428,648, filed February 15, 1930, mentioned above.

In the present application, I do not claim the control of the generator excitation by means responsive to a control voltage, the terminal voltage of the motor, and a voltage proportional to the motor armature current, nor by means responsive to a control voltage and a voltage substantially equal to the counter-electromotive force of the work motor, as this subject matter is covered in my copending application Serial No. 445,303, filed April 18, 1930, mentioned above.

I do not claim the control of the generator excitation broadly by means responsive to the terminal voltage of the motor and a voltage proportional to the motor armature current, nor broadly by means responsive to a voltage substantially equal to the motor counter-electromotive force, as this subject matter is claimed in my copending application Serial No. 445,304, filed April 18, 1930, mentioned above.

In the present application, I do not claim the control of the rate of change of speed of an elevator motor by means including a load responsive element for correcting the motor speed regulation, means for determining the rate of change of speed of the elevator motor, and additional load responsive means for operating upon the last mentioned means to cause the rate of change of speed of the elevator motor to be the same under all load conditions, as this subject matter is claimed in my copending application Serial No. 471,684, filed July 30, 1930, mentioned above.

I do not desire that my invention shall be restricted to the specific structural details, arrangement of parts or circuit connections herein set forth, as many modifications thereof may be effected without departing from the spirit and scope of my invention. I desire, therefore, that only such limitations shall be imposed as are indicated in the appended claims.

I claim as my invention:

1. In a motor-control system, a motor; a main generator; electrical conductors completing a circuit including the armatures of said motor and said main generator; a control generator; means for accelerating and decelerating said control generator to thereby vary its voltage, and means, responsive to the voltage of said control generator and a voltage substantially equal to the counter-electromotive force of said motor, for controlling the excitation of said main generator to maintain the speed of said motor at values determined by the voltage of said control generator, regardless of the load on said motor.

2. In a motor-control system, a motor, a main generator, electrical conductors completing a circuit including the armatures of said motor and said main generator; a control generator; means for accelerating and decelerating said control generator to thereby vary its voltage, and means, responsive to the difference between the voltage of said control generator and a voltage substantially equal to the counter-electromotive force of said motor, for controlling the excitation of said main generator to maintain said difference at a predetermined value.

3. In a motor-control system, a motor; a main generator, electrical conductors completing a circuit including the armatures of said motor and said main generator; a control generator; means for accelerating and decelerating said control generator to thereby vary its voltage, and a vibrating relay, responsive to the voltage of said control generator and a voltage substantially equal to the counter-electromotive force of said motor, for controlling the excitation of said main generator to maintain the speed of said motor at values determined by the voltage of said control generator, regardless of the load on said motor.

4. In a motor-control system, a motor; a main generator; electrical conductors completing a circuit including the armatures of said motor and said main generator; a control dynamo-electric machine; means for accelerating said control machine to increase its voltage; an electromagnetic brake for decelerating said control machine to decrease its voltage, and means for controlling the excitation of said main generator to maintain the speed of said motor at values determined by the voltage of said control machine.

5. In a motor-control system, a motor; a main generator; electrical conductors completing a circuit including the armatures of said motor and said main generator; a control generator; means for accelerating said control generator to increase its voltage; an electromagnetic brake for decelerating said control generator to decrease its voltage; means for controlling the exicitation of said main generator to maintain the speed of said motor at values determined by the voltage of said control generator, and means for varying the torque produced by said electromagnetic brake to thereby control the rate of change of speed of said motor while said electromagnetic brake is decelerating said control generator.

6. In a motor-control system, a motor; a main generator; electrical conductors completing a circuit including the armatures of said motor and said main generator; a control generator; means for accelerating said control generator to increase its voltage; an electromagnetic brake, comprising an induction member and a winding for exciting it, for decelerating said control generator to decrease its voltage; an energizing circuit for said winding; means for controlling the excitation of said main generator to maintain the speed of said motor at values determined by the voltage of said control generator, and means for controlling the current in said energizing circuit to thereby control the rate of change of speed of said motor while said electromagnetic brake is decelerating said control generator.

7. In a motor-control system, a motor; a main generator; electrical conductors completing a circuit including the armatures of said motor and said main generator; a control generator; means for accelerating said control generator to increase its voltage; an electromagnetic brake, comprising an induction member and a winding for exciting it, for decelerating said control generator to decrease its voltage; a resistor; an energizing circuit for said winding including said resistor; means for controlling the excitation of said main generator to maintain the speed of said motor at values determined by the voltage of said control generator, and means for varying the effect of said resistor to thereby control the rate of change of speed of said motor while said electromagnetic brake is decelerating said control generator.

8. In a motor-control system, a motor; a main generator; electrical conductors completing a circuit including the armatures of said motor and said main generator; a control generator; means for accelerating said control generator to increase its voltage; an electromagnetic brake, comprising an induction member and a winding for exciting it, for decelerating said control generator to decrease its voltage; an energizing circuit for said winding; means for controlling the excitation of said main generator to maintain the speed of said motor at values determined by the voltage of said control generator, and means responsive to the load on said motor for controlling the current in said energizing circuit to thereby control the rate of change of speed of said motor while said electromagnetic brake is decelerating said control generator.

9. In a motor-control system, a motor; a main generator; electrical conductors completing a circuit including the armatures of said motor and said main generator; a control generator; means for accelerating said control generator to increase its voltage; an electromagnetic brake, comprising an induction member and a winding for exciting it, for decelerating said control generator to decrease its voltage; means responsive to the voltage of said control generator and a voltage substantially equal to the counter-electromotive force of said motor, for controlling the excitation of said main generator to maintain the speed of said motor at values determined by the voltage of said control generator, regardless of the load on said motor, and means for varying the current in said energizing circuit to thereby control the rate of change of speed of said motor while said electromagnetic brake is decelerating said control generator.

In testimony whereof, I have hereunto subscribed my name this 9th day of June, 1931.

WILLIAM F. EAMES.